Dec. 23, 1958 R. A. PALMER 2,865,279
TOASTER APPARATUS
Filed July 6, 1956 3 Sheets-Sheet 1

INVENTOR
REED A. PALMER
BY M.C. Freudenberg
ATTORNEY

Dec. 23, 1958   R. A. PALMER   2,865,279
TOASTER APPARATUS
Filed July 6, 1956   3 Sheets-Sheet 2
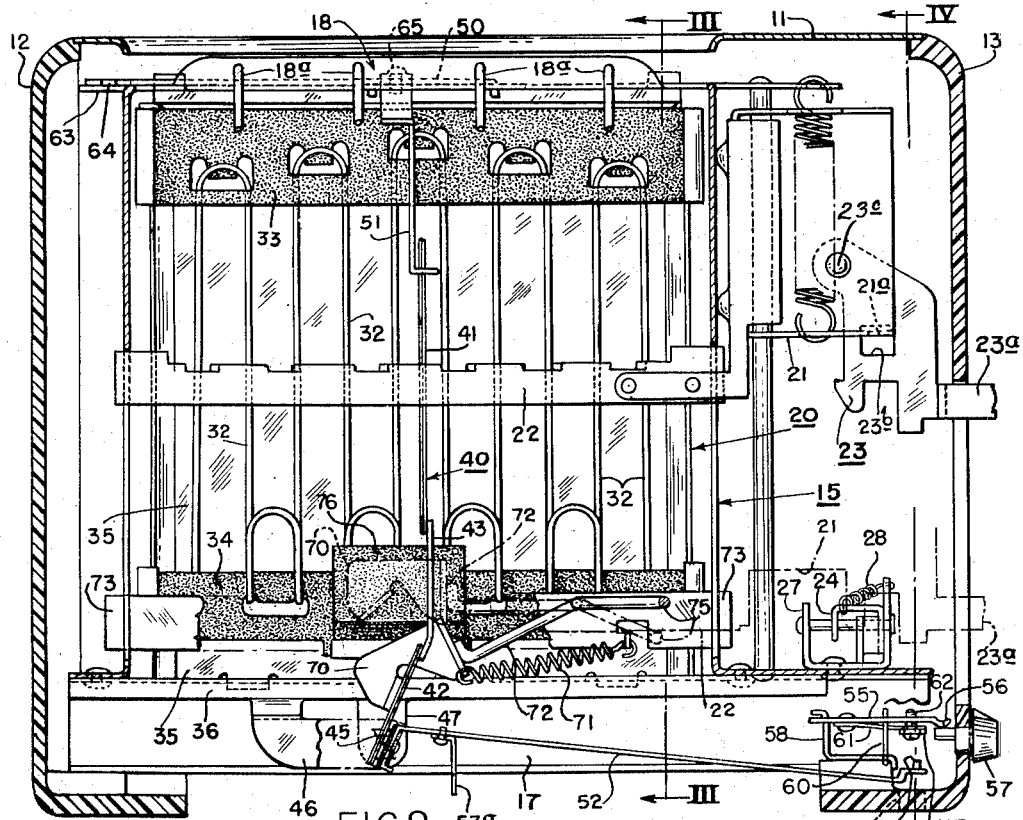
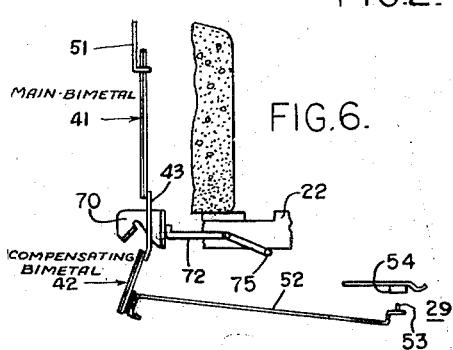
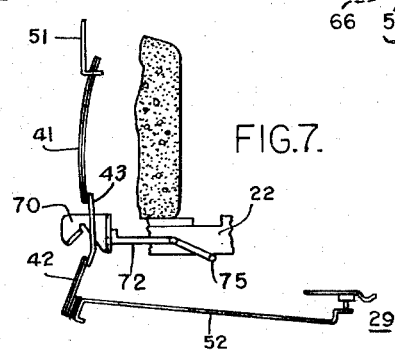
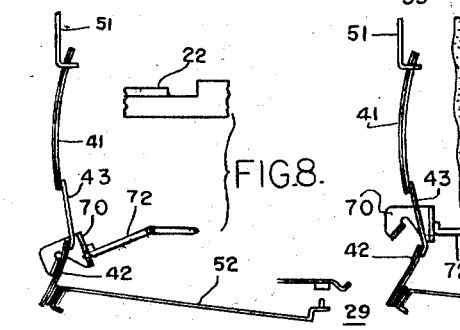
INVENTOR
REED A. PALMER
BY *M. C. Freudenberg*
ATTORNEY Dec. 23, 1958 R. A. PALMER 2,865,279
TOASTER APPARATUS
Filed July 6, 1956 3 Sheets-Sheet 3

INVENTOR
REED A. PALMER
BY M.C. Freudenberg
ATTORNEY

United States Patent Office 2,865,279
Patented Dec. 23, 1958

2,865,279

TOASTER APPARATUS

Reed A. Palmer, Mansfield, Ohio, assignor to Westinghouse Electric Corporation, East Pittsburgh, Pa., a corporation of Pennsylvania Application July 6, 1956, Serial No. 596,221

8 Claims. (Cl. 99—329)

This invention relates to a thermally responsive control mechanism for bread toasting apparatus and has for an object to provide an improved control mechanism of this kind.

A further object of this invention is to provide an improved control of the above type responsive to a condition of the bread being toasted for effecting uniform toasting during successive toasting operations.

A still further object of this invention is to provide an improved control of the above type that can be operated to control a series of closely successive toasting operations.

A still further object of this invention is to provide an improved thermally responsive device in a toaster having a movable bread carriage wherein the thermally responsive device is conditioned at the end of a toasting operation to permit a closely succeeding toasting operation.

Another object of this invention is to provide an improved control device of the type set forth adjustable to permit wide variations in the degree of toasting.

In accordance with this invention, an improved control is provided for a bread toaster constructed with a toasting chamber having electric heaters disposed on opposite sides thereof and arranged to receive a bread slice between the heaters. At one side of the bread receiving chamber is located a thermally responsive device comprising a main bimetal responding to the temperature of the surface of the bread slice during a toasting operation. The bimetal deflects in response to heat received from the bread being toasted to actuate one contact of a control switch into engagement with a manually adjustable contact to energize a relay for terminating the toasting operation. An ambient temperature compensating bimetal is located within the toaster casing at a point remote from the main toasting heaters and is arranged so that upon being heated it will deflect tending to provide relative movement of the switch contacts opposite to that movement caused by the heating of the main bimetal. This opposition to the main bimetal compensates the latter for changes in ambient temperature within the toaster to assure greater uniformity in the degree of toasting during successive toasting operations.

If closely successive toasting operations are to be performed, the control switch must be made to open after one toasting operation is terminated and before the next toasting operation is attempted so that the initiation of the next operation will not be prevented by the switch remaining closed.

To automatically and quickly open the control switch at the end of a toasting operation, a means is provided to overheat the compensating bimetal during the period between the end of one toasting operation and the start of a succeeding operation. This heating means comprises a movable heat storage member which is remotely disposed from the compensating bimetal to receive and store heat from a heating device, such as a toaster heater, during a toasting operation. The heat storage member is moved into good heat transfer relationship with the compensating bimetal, and gives up heat to the latter, in response to the closing of the control switch which terminates the toasting operation. During a first part of any closely succeeding toasting operation, the heat imparted to the compensating bimetal will cause the latter to keep the contacts of the control switch separated, at least until the main bimetal has cooled enough to keep the contacts separated. Before the end of any succeeding operation, the temperatures of the main and compensating bimetals will have changed sufficiently to permit them to perform their respective bread temperature sensing and ambient compensating functions to determine when the toasting operation is completed.

These and other objects are effected by the invention as will be apparent from the following description and claims taken in connection with the accompanying drawings, forming a part of this application, in which:

Fig. 2 is a vertical section taken through the center of a bread toasting chamber of a toaster of the type shown in Fig. 1, this section being indicated by lines II—II of Figs. 3 and 4;

Fig. 6 illustrates the position of the bread carriage and the condition of a portion of the control device at the beginning of a first toasting operation when the toaster is cool;

Figure 1:
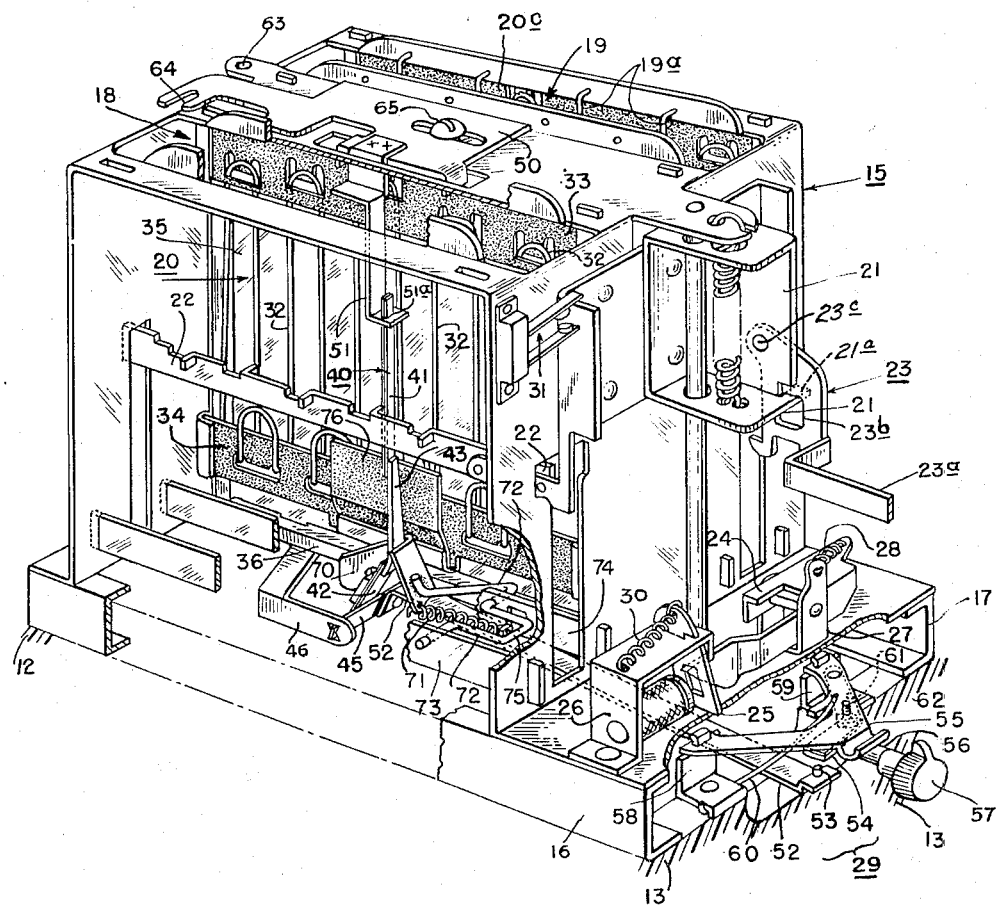
Fig. 1 is a perspective view showing the operating mechanisms of a toaster with the casing removed and portions of the toaster structure cut away to clarify the illustrations.

Fig. 7 indicates the condition of the control device at the instant the control switch is closed to terminate a first toasting operation, but before the bread carriage has risen;

Fig. 8 illustrates the condition of the control device shortly following the raising of the carriage from the position illustrated in Fig. 7; and Fig. 9 illustrates the condition of the control device at the beginning of a second or succeeding toasting operation with the toaster structure heated.

Referring to Fig. 2 a control according to this invention is shown in one form in a toasting apparatus comprising a casing having a metal wrapper 11 and a pair of plastic end walls 12 and 13. The casing encloses the operating mechanisms seen in Fig. 1 which are, for the most part, carried by an inverted generally U-shaped frame 15 supported within the casing by a pair of channel members 16 and 17 extending along opposite sides of the casing and secured to the end walls 12 and 13. The toaster is provided with two toasting chambers 18 and 19, each having a pair of electrical heating elements 20, 20a and 20b, 20c, respectively, each element being similar to heater 20 shown in Figs. 1 and 2, and disposed to heat the opposite faces of a bread slice positioned within each chamber. The heaters 20, 20a, 20b and 20c may be of the type disclosed and claimed in Palmer et al. application, Serial No. 444,112, filed July 19, 1954, now Patent No. 2,778,912. The bread is guided within the toasting chambers 18 and 19 and centrally positioned between the heaters by means of a plurality of vertically strung wires 18a and 19a secured to the frame 15.

Supported for vertical sliding movement on a rod at one end of the frame 15 is a carriage 21 having a pair of bread supporting bars 22 and 22a extending into the two toasting chambers. The carriage 21 is biased upwardly by a spring to a bread receiving or non-toasting position, as seen in Figs. 1 and 2. The carriage 21 carries a pivotally attached latch 23 having a manually actuated portion 23a extending through a vertical slot in the toaster end wall 13. The latch extension 23a may carry a manual actuating knob (not shown) for depressing it to lower the carriage to a bread toasting position wherein the carriage will be retained by engagement of the latch 23 with a pivoted detent 24.

Figure 4:
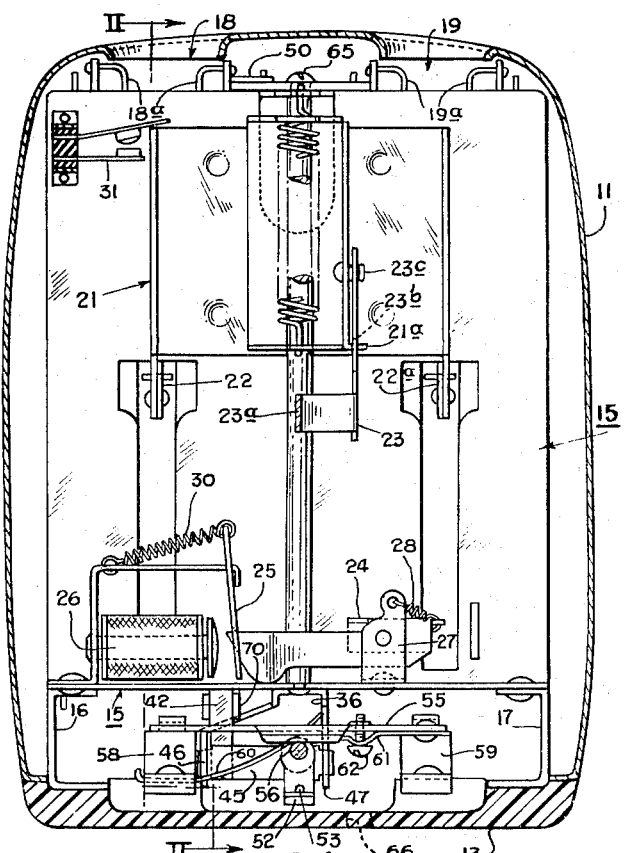
Fig. 4 is a vertical section taken on line IV—IV of Fig. 2.

As seen in Fig. 2, the latch 23 is biased clockwise about its pivotal support 23c by gravity. The movement of the latch 23 relative the carriage 21 is limited by a projection 21a on the carriage 21 which extends into a central opening 23b in the latch. The end of the detent 24 is held against release of the latch 23 by a pivoted armature 25 of an electromagnetic relay 26. The detent 24 is pivotally mounted on a pin supported by the stationary frame 27 and is biased counterclockwise thereabout, as seen in Fig. 4, by a tension spring 28. It will be noted from Figs. 1 and 2 that the tension spring 28 is disposed at an acute angle to the axis of the pin supporting the detent 24 so that the latter is also biased axially of the pin and to right, as viewed in Fig. 2. During movement of the latch 23 to its latched position, the detent 24 will be momentarily displaced to the left as seen in Fig. 2, but is returned by the spring 28 to hold the latch 23. The carriage 21 may be released for return to its nontoasting position by manually lifting the latch extension 23a to move the latch out of engagement with the detent 24 or by the closing of a switch 29 which will energize the relay 26 to attract its armature 25 and release the detent 24. The upwardly biased carriage 21 and latch 23 swing the detent 24 clockwise to uncouple the latch 23 and detent 24, as upward movement of the carriage 21 and latch 23 is initiated.

The switch 29 is actuated by means which respond to a change in a condition of the bread being toasted as will be explained hereinafter. After the carriage 21 is returned to its non-toasting position by closing the switch 29, the armature 25 and the detent 24 will be returned into latching engagement, as seen in Fig. 4, by springs 30 and 28, respectively.

The four toaster heating elements 20, 20a, 20b and 20c are connected in series with each other and with a line switch 31. The switch 31 is biased closed and is located on the frame 15 where it will be opened to deenergize the heater elements by the movement of the carriage 21 to its non-toasting position. When the carriage 21 is latched in its toasting position the switch 31 will be closed to energize the heating elements. Each of the heating elements, like element 20, comprises a resistance wire 32 strung in a generally serpentine configuration between upper and lower horizontally extending mica strips 33 and 34, respectively. These strips are supported by heat reflecting metal plates 35 having tabs at their upper and lower edges which project into slots in the frame 15, channel members 16 and 17 and a channel member 36 carried by the frame 15 beneath the two center heaters and extending parallel to members 16 and 17 midway therebetween.

A thermally responsive L-shaped structure 40 for sensing the toasted condition of a bread slice and for actuating the switch 29 comprises a vertical arm including bread temperature responsive bimetal strip 41, an ambient temperature compensating bimetal strip 42, a rigid metal bar 43 connecting the flat bimetal strips 41 and 42 and a horizontal lever arm 52 carrying a contact 53 of the switch 29. The strips 41 and 42 and the bar 43 are connected end-to-end and arranged generally vertically with the bimetal strip 42 at the bottom and with its lower end attached to a horizontally extending bar 45. The latter has its ends pivotally supported beneath the toasting chamber 18 in a pair of arms 46 and 47 depending from the channel member 36. The bar 45 is freely pivoted so that the L-shaped structure 40 is not stressed by any supporting members as long as switch 29 is open. The thermally responsive structure 40 extends upwardly from the bar 45 into the toasting chamber 18 at one side thereof between the bread support bar 22 and the heater 20.

Figure 3:
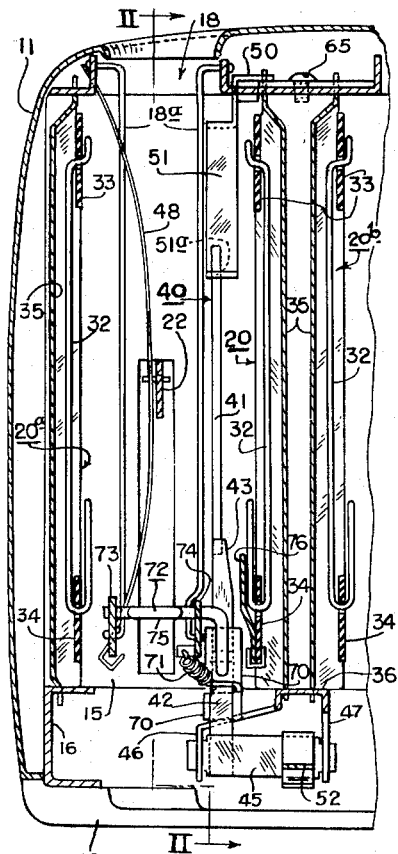
Fig. 3 is a vertical section taken on line III—III of Fig. 2.

The compensating bimetal strip 42 is located beneath the toasting chamber 18 and remote from the bread toasting heaters so as to receive a minimum of direct radiant heat therefrom. The rigid bar 43 is connected at its lower end to the upper end of the bimetal 42. The upper end of the bar 43 is connected to the lower end of the bimetal 41 at a point above the top of the bread bar 22 when the latter is in its lowermost position. The bimetal 41 is slightly shorter than the height of an average slice of bread and is positioned so that its entire length will be disposed opposite the surface of a bread slice during a toasting operation. The bimetal 41 is relatively narrow as compared with bimetal 42, as seen in Fig. 3, and is arranged edgewise with respect to the face of the bread slice and preferably located much nearer to this surface than to the heater 20 so as to be particularly responsive to changing temperature conditions at the surface of the bread slice. A bowed wire spring 48 is disposed in the toasting chamber 18 to urge a slice of bread on the bread bar 22 toward the bimetal 41 and into engagement with the bread wires 18a during a toasting operation, but is arranged so as not to interfere with the vertical movement of the bread slice with the bar 22. Thus, the bread slices inserted in chamber 18 during successive toasting operations will be uniformly positioned relative the bimetal 41, but are kept out of direct contact therewith by the bread wires 18a.

The upper end of the structure 40 is adjustably positioned by means of a support 50 that is slidable on the frame 15. The support 50 has an arm 51 extending down into the toasting chamber 18 and the lower end of this arm is bent to extend substantially normal to the bimetal strip 41 and has a slot 51a therein through which the bimetal strip 41 extends. The edges of the slot 51a restrain the upper end of the bimetal strip 41 against horizontal or transverse movement, but permit pivotal and vertical or longitudinal sliding movement therein.

The bar 45 pivots about an axis normal to the vertical planes of the bread slice and the heating element 20. The lever arm 52 is electrically conducting and has one end attached to the bar 45, but is electrically insulated therefrom, and its other end carries a piece of platinum wire forming the contact 53 of the switch 29. The arm 52 is swingable about the axis of the bar 45 in response to pivotal movement of the latter caused by the bowing of one or both of the bimetal strips 41 and 42 in a manner described hereinafter. The contact 53 is thus movable into and out of engagement with the other contact 54 of the switch 29.

The main bimetal 41 has its high expansion side facing the left end wall 12 of the toaster, as seen in Fig. 2, whereas the compensating bimetal is reversed so that its high expansion side faces the opposite direction. When heated the bimetal 41 tends to bow with its convex side toward the end wall 12. Since the movement of the opposite ends of the structure 40, which includes the bimetal 41, is restricted, the bowing of the bimetal 41 upon heating causes the bar 45 to pivot counterclockwise, as seen in Fig. 2, and move the arm 52 carrying contact 53 toward contact 54. During a toasting operation, the bimetal 41 will deflect in a plane parallel to the surface of the bread in response to heat received from the bread which will be an accurate indication of the color or degree of toasting of the bread slice. The bimetal 41 will also deflect in response to changes in ambient temperature, but the amount of its deflection due to this factor will be compensated for by the bimetal 42, which deflects in the opposite direction, so that the relative movement of the contacts 53 and 54 is primarily a function of the changing condition of the bread surface.

The contact 54 of the switch 29 is carried by a V-shaped member 55, the legs of which are pivotally supported on the upper edges of a pair of L-shaped brackets 58 and 59. These brackets are attached to a lower portion of the electrically insulating end wall 13 of the toaster casing extending inwardly beneath the frame 15. A wire spring 60, clamped beneath the bracket 58, biases the apex of the V-shaped member 55 into engagement with an eccentric cam surface 56 formed on the inner end of a manual adjusting knob 57 that is rotatably supported in an opening in the casing end wall 13. The contact 54 is attached to one end of an electrically conducting spring strip 61 that is carried by the V-shaped member 55. The contact 54 is located near the apex of the V-shaped member 55 and is biased downwardly relative thereto by the spring 61. The movement of the spring 61 is limited by an adjusting screw 62 extending through a hole therein and threaded in the V-shaped member 55. The adjusting screw is accessible through a hole 66 in the bottom of the end wall 13 to enable fine adjustments of the position of the contact 54 relative the cam surface 56 to be made.

During manufacture of the toaster a preliminary adjustment of the thermally responsive L-shaped structure 40 is made by sliding the support 50 along the top of the frame 15. This adjustment is made at one end of the toaster with a calibrating tool (not shown) connected to a tab 63 on the frame and an extension 64 of the support 50. The adjustment is performed while the knob 57 is in a preselected position by moving the support 50 in one direction until the switch 29 just closes, then backing it off in the other direction a predetermined distance and finally fixing its position by tightening the screw 65 in the frame 15. Any further adjustment of the control that is deemed necessary after observing the results of a toasting operation may be made by adjusting the screw 62.

Figure 5:
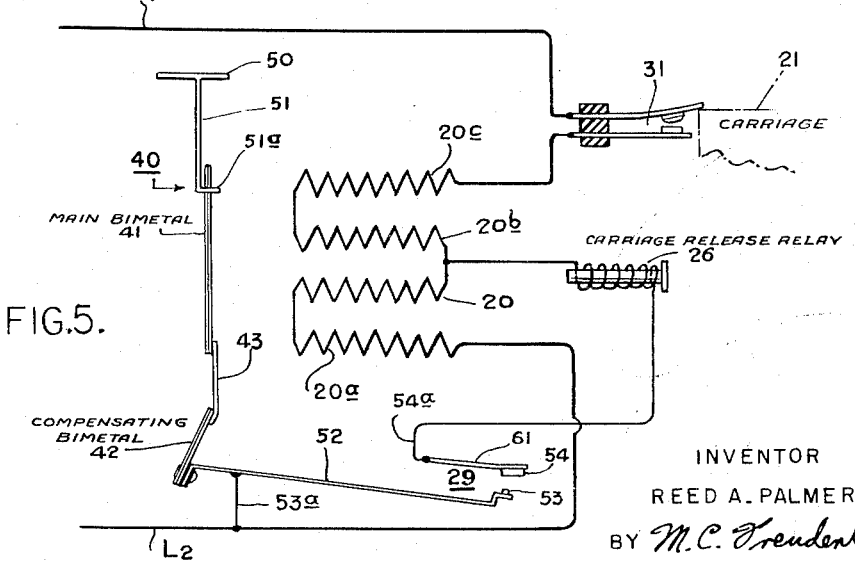
Fig. 5 is a schematic circuit showing the toaster heater and the control elements therefor.

Electrical connections to the contacts 53 and 54 of switch 29 may be made by attaching flexible conductors 53a and 54a to the arm 52 and spring strip 61, respectively, as indicated schematically in Fig. 5. As pointed out above, the arm 52 is electrically insulated from the bar 45, and thus from the bimetals 41 and 42. The bimetals are not required to carry any current, nor are they electrically energized at any time, thus reducing the electrical shock hazard in the event the user sticks a finger or a piece of silverware into the toasting chamber 18 to free a piece of toast stuck therein.

Supported for movement into and out of good heat transfer relationship with the wide low expansion face of the compensation bimetal 42 is a heat storage means comprising a metal member 70 of good heat conductivity and high specific heat. This heat storage member 70 is pivotally supported by means of a wire member 72 on a pair of metal supports 73 and 74 extending lengthwise of the toasting chamber 18 near the bottom thereof and is biased into engagement with the compensating bimetal 42, as seen in full lines in Fig. 2, by means of a spring 71. The wire member 72 has a portion 75 extending transversely of the chamber between the supports 73 and 74 which is positioned to be engaged by the lower edge of bread bar 22 when the carriage 21 is moved to its toasting position. When the bread bar 22 engages the wire portion 75, the wire member 72 pivots to move the heat storage member 70 upwardly to the position seen in dotted lines in Fig. 2 where it will be disposed out of good heat transfer relationship with the bimetal 42 between the rigid bar 43 and a portion of the adjacent heating element 20. The member 70 is prevented from coming in direct contact with the resistance wire 32 of the heating element 20 by means of an electrically insulating mica sheet 76 which is clamped to the heating element 20. During a toasting operation, the member 70 receives and stores heat from the heating element 20. When the carriage rises at the end of a toasting operation, moving the bread bar 22 out of engagement with the wire portion 75, the force of the spring 71 and the weight of the member 70 cause the latter to drop into contact with the compensating bimetal, whereupon it will give up heat thereto and cause the compensating bimetal to quickly deflect to separate the contacts of switch 29 to condition the control for a closely succeeding toasting operation. The amount of heat that can be transferred to the compensating bimetal 42 may be limited by the mass of the heat storage member 70 and/or the mass of the bimetal 42, assuming that there is very good heat transfer therebetween. It is preferable that this amount of heat be limited so that, after one toasting operation is completed and a second closely succeeding operation is initiated, the cooling of the bimetal 42 lags the cooling of bimetal 41 only just sufficiently to assure that the switch 29 will not close prematurely.

The compensating bimetal 42 and its heating member 70 thus form a time delay means to interfere with the actuation of switch 29 by the main bimetal 41 until the latter is cooled to a temperature below its normal actuating temperature during a first portion of each of a series of successive toasting operations. Of course, during the first portion of the first toasting operation the main bimetal will be cool if the toaster has not been used for a while so there is no danger of the bimetal 41 closing switch 29 prematurely. However, the bimetal 42 and the heating member 70 operate to interfere with actuation of the switch 29 by bimetal 41 in case the latter is above its actuating temperature during a first portion of at least all but the first of several closely succeeding toasting operations.

The operation of the bread responsive control device of the present invention may be made more clear by referring to Figs. 6 through 9 and the circuit diagram of Fig. 5. The operation will be described from a starting point at which the entire toaster is cool or at normal room temperature. After inserting a slice of bread in the toasting chamber 18 the carriage is manually moved to its toasting position and latched therein. The toaster heating elements will be energized by the switch 31 and the thermally responsive structure 40, switch 29 and the heat storage member 70 assume the relative positions indicated in Fig. 6. While the bread in chamber 18 is being toasted, the member 70 will receive and store heat from the adjacent heating element 20 and, when the bread has reached the desired color or degree of toasting, the bimetal 41 will deflect to close the switch 29 as seen in Fig. 7. At the instant the switch 29 closes, the relay 26 will be connected in shunt with the heating elements 20 and 20a and will be energized to effect release of the latching means which held the carriage in its toasting position.

Immediately after the carriage is released to its non-toasting position, the heat storage member 70 will engage the compensating bimetal and transfer heat thereto causing it to bow, as seen in Fig. 8, to quickly separate the contacts of switch 29, even if the main bimetal 41 remains for a short period of time at the temperaure at which it caused the switch 29 to close. The switch 29 will be opened, by the heating of the compensating bimetal 42, within the time normally taken by the user to remove the toasted bread slice and insert another bread slice to be toasted during a succeeding toasting operation. After the carriage is moved to its toasting position for a closely succeeding toasting operation the thermally responsive structure 40, switch 29 and member 70 will assume the relative positions indicated in Fig. 9. The main bimetal 41 and the compensating bimetal 42 are bowed due to the heat stored in each at the end of the first toasting operation, and both will cool before the second toasting operation is completed so that they will be able to carry out their respective bread responsive and compensating functions to terminate the toasting operation with the color of the toast being uniform at the completion of each of a series of closely successive toasting operations.

The color of the toast or the degree of toasting is determined by the temperature which the main bimetal 41 must attain to close the switch 29. This temperature may be manually varied by the user by means of the knob 57 which shifts the position of the contact 54 of the switch 29 relative the contact 53 that is actuated by the main bimetal 41.

While the invention has been shown in but one form, it will be obvious to those skilled in the art that it is not so limited, but is susceptible of various changes and modifications without departing from the spirit thereof.

What is claimed is:

1. In a control mechanism for an electric toaster comprising a bread support and an electric heater disposed to heat one side of a slice of bread positioned on said support, the combination of a switch for controlling energization of said heater, means for closing said switch to initiate a toasting operation, a thermally responsive structure comprising a main bimetal strip arranged to receive heat from the surface of said one side of said bread slice during a toasting operation, means actuated by said main bimetal strip upon attaining an actuating temperature in response to heat received thereby from said bread slice to open said switch means and terminate the toasting operation, a thermally responsive member for compensating said main bimetal to reduce the effect of ambient temperature changes on the actuation of said actuated means, and means for heating said thermally responsive member upon termination of a toasting operation to overcompensate said main bimetal strip to prevent the latter from actuating said actuated means during a succeeding toasting operation until after said main bimetal strip is cooled below its actuating temperature.

2. In a control mechanism for a toaster comprising a toaster heating element, the combination of means for energizing the toaster heating element to initiate a toasting operation, a thermally responsive control device including a switch having a pair of contacts arranged to control the duration of said toasting operation, a first bimetallic strip arranged to actuate one of said contacts in response to a changing condition of a surface of a bread slice being toasted in said toaster to terminate said toasting operation, a compensating bimetallic strip arranged to move one of said contacts to compensate said switch for changes in ambient temperature sensed by the first bimetallic strip, a heat storage member disposed for movement into and out of good heat transfer relationship with said compensating bimetallic strip, said heat storage member having a first position wherein it receives heat from the toaster heating element during the toasting operation and being movable to a second position in good heat transfer relationship with said compensating bimetallic strip, and means for moving said heat storage member to said first position in response to initiation of the toasting operation and to said second position in response to termination of a toasting operation.

3. In a control mechanism for an electric toaster comprising an electric resistance heating element disposed on one side of a bread toasting chamber, the combination of means for energizing said heating element to initiate a toasting operation, a switch arranged to be actuated to terminate the toasting operation, a thermally responsive structure for actuating said switch comprising a main bimetallic strip disposed to sense a change in condition of the surface of a slice of bread being toasted in said chamber and an ambient temperature compensating bimetallic strip, a heat storage member movable into a first position in good heat transfer relationship with the compensating bimetallic strip and movable to a second position wherein it will receive the store heat from a portion of said heating element during a toasting operation, means for retaining said heat storage member in said second position during a toasting operation, said main bimetallic strip being arranged to actuate said switch to terminate the toasting operation in response to a change in the condition of a bread slice being toasted, said compensating bimetallic strip being arranged to deflect upon being heated by said heat storage member to quickly return said switch to its unactuated condition immediately after a toasting operation is completed to permit a closely succeeding toasting operation to be performed.

4. In a control mechanism for a toaster comprising a pair of electrical resistance heating elements spaced for defining an intervening bread toasting chamber, the combination of a movable bread support having a portion extending into said chamber and arranged to move between a toasting and non-toasting position, means for energizing said toaster heating elements when said bread support is moved to its toasting position, a switch for controlling the duration of a toasting operation, a thermally responsive structure comprising a main bimetal and a compensating bimetal for actuating said switch to terminate a toasting operation, said main bimetal being disposed within said chamber with its edge facing the area to be occupied by a bread slice within said chamber on said support and being deflectible in a plane parallel to and adjacent the surface of said slice, said compensating bimetal being located remote from the toaster heating elements and arranged to oppose the actuation of said switch by said main bimetal, and a heat storage member supported in said toaster for movement to a first position in heat receiving relationship with respect to one of said toaster elements when said bread support is moved to its toasting position, said member being movable to a second position in good heat transfer relationship with said compensating bimetal in response to the termination of a toasting operation.

5. In a control mechanism for a bread toaster comprising a bread support and an electric heater disposed to heat one side of a slice of bread positioned on said support, the combination of means for energizing said heater to initiate a toasting operation, switch means for effecting termination of the toasting operation, and a thermally responsive control device for actuating said switch means, said control device including a structure comprising a main bimetal, one end of said structure being pivotally supported in said toaster, said one end being pivotally movable in response to temperature change of said bimetal, supporting means for engaging the other end of said structure to permit sliding movement relative thereto but restraining said other end of said structure against arcuate movement about said pivotally supported end, and means connected to the pivotally supported end of said structure for actuating said switch means in response to heating of said main bimetal, the main bimetal being positioned to respond to a toasted condition of said one side of the slice of bread on said support and arranged edgewise with respect to the bread to deflect in a plane parallel to said side.

6. In a control mechanism for a bread toaster comprising a bread support and an electric heater disposed to heat one side of a slice of bread positioned on said support, the combination of means for energizing said heater to initiate a toasting operation, switch means for effecting termination of the toasting operation, and a thermally responsive control device for actuating said switch means, said control device including a structure comprising a main bimetal and an ambient temperature compensating bimetal rigidly connected, one end of said structure being pivotally supported in said toaster and being pivotally movable in response to temperature change of the main bimetal, supporting means for engaging the other end of said structure to permit sliding movement relative thereto but restraining said other end of said structure against arcuate movement about said pivotally supported end, and means connected to the pivotally supported end of said structure for actuating said switch means in response to heating of said main bimetal, the main bimetal being positioned to respond to a toasted condition of said one side of the slice of bread on said support and arranged edgewise with respect to the bread to deflect in a plane parallel to said side.

7. In a control mechanism for a bread toaster comprising a bread support and an electric heater disposed to heat one side of a slice of bread positioned on said support, the combination of means for energizing said heater to initiate a toasting operation, switch means for effecting termination of the toasting operation, and a thermally responsive control device for actuating said switch means, said control device including a structure comprising a main bimetal and an ambient temperature compensating bimetal rigidly connected, one end of said structure being pivotally supported in said toaster and being pivotally movable in response to temperature change of the main bimetal, supporting means for engaging the other end of said structure to permit sliding movement relative thereto but restraining said other end of said structure against arcuate movement about said pivotally supported end, and means connected to the pivotally supported end of said structure for actuating said switch means in response to heating of said main bimetal, the main bimetal being positioned to respond to a toasted condition of said one side of the slice of bread on said support and arranged edgewise with respect to the bread to deflect in a plane parallel to said side, said supporting means being adjustable to vary the amount of heating of said main bimetal that is necessary to actuate said switch means.

8. In a control mechanism for a bread toaster comprising means defining a generally vertical toasting well, a bread support and an electric heater disposed to heat one side of a slice of bread positioned on said support in said well, the combination of means for energizing said heater to initiate a toasting operation, switch means for effecting termination of the toasting operation, and a thermally responsive control device for actuating said switch means, said control device including a structure comprising a main bimetal and an ambient temperature compensating bimetal rigidly connected, one end of said structure being pivotally supported in said toaster and being pivotally movable in response to temperature change of the main bimetal, supporting means for engaging the other end of said structure to permit sliding movement relative thereto but restraining said other end of said structure against arcuate movement about said pivotally supported end thereof, the main bimetal being positioned to respond to a toasted condition of said one side of the slice of bread on said support and arranged edgewise with respect to the bread to deflect in a plane parallel to said side, said structure being pivotally supported beneath said bread support with the supporting means for engaging said other end of said structure being located near the top of said well, said compensating bimetal being located out of good heat transfer relationship with the toaster heater, and a lever arm rigidly connected to the lower pivoted end of said structure for actuating said switch means in response to heating of said main bimetal.

References Cited in the file of this patent

UNITED STATES PATENTS

| | | |
|---|---|---|
| 2,179,811 | Brosseau | Nov. 14, 1939 |
| 2,250,979 | Winborne | July 29, 1941 |
| 2,615,386 | Palmer | Oct. 28, 1952 |
| 2,632,085 | Brosseau | Mar. 17, 1953 |
| 2,667,115 | Vogelsberg | Jan. 26, 1954 |
| 2,778,912 | Palmer et al. | Jan. 22, 1957 |

UNITED STATES PATENT OFFICE
CERTIFICATE OF CORRECTION

Patent No. 2,865,279                 December 23, 1958

Reed A. Palmer

It is hereby certified that error appears in the printed specification of the above numbered patent requiring correction and that the said Letters Patent should read as corrected below.

Column 7, line 73, for "the store" read -- and store --.

Signed and sealed this 8 th day of December 1959.

(SEAL)
Attest:
KARL H. AXLINE
Attesting Officer

ROBERT C. WATSON
Commissioner of Patents